United States Patent [19]

Zeiringer

[11] Patent Number: 5,597,543

[45] Date of Patent: Jan. 28, 1997

[54] SPHERICAL NITRIDE

[75] Inventor: Hans Zeiringer, Kappel/Krappfeld, Austria

[73] Assignee: Treibacher Industrie AG, Treibach, Austria

[21] Appl. No.: 503,339

[22] Filed: Jul. 17, 1995

[30]  Foreign Application Priority Data

Jul. 22, 1994 [AT] Austria .................................. 1457/94

[51] Int. Cl.$^6$ .......................... C01C 3/08; C01B 21/076
[52] U.S. Cl. .......................................... 423/380; 423/411
[58] Field of Search ..................................... 423/411, 380

[56]  References Cited

U.S. PATENT DOCUMENTS

| | | | |
|---|---|---|---|
| 2,461,018 | 2/1949 | Alexander | 423/411 |
| 3,334,974 | 8/1967 | Fletcher et al. | 423/411 |
| 5,147,831 | 9/1992 | Zeiringer | 423/411 |

FOREIGN PATENT DOCUMENTS

| | | | |
|---|---|---|---|
| 394188 | 2/1992 | Austria . | |
| 512967 | 11/1992 | European Pat. Off. . | |
| 59507 | 3/1987 | Japan | 423/411 |

OTHER PUBLICATIONS

Friedrich and Sittig, 1925, mentioned in: *Hartstoffe*, by Kiefer and Benesovsky, Vienna Springer Verlag 1963, p. 296.

*Primary Examiner*—Wayne Langel
*Attorney, Agent, or Firm*—Collard & Roe, P.C.

[57]  ABSTRACT

A spherical powder selected from the group consisting of titanium nitride, titanium carbonitride, titanium nitride containing a metal of the IVa, Va and VIa group of the periodic table, and titanium carbonitride containing a metal of the IVa, Va and VIa group of the periodic table, having an average grain size of more than 2 μm and a narrow grain spectrum, is prepared by introducing into a reaction vessel a mixture of at least one substance selected from the group consisting of titanium metal, a metal of the IVa, Va and VIa group of the periodic table, and an oxide, carbide, nitride and carbonitride of said metals, and a carbon-containing substance, establishing a nitrogen atmosphere in the reaction vessel, heating the mixture in the reaction vessel to a temperature between 800° C. and 2400° C. and maintaining the temperature between 1400° C. and 2000° C. until gaseous reaction products are produced, removing the gaseous reaction products as they are produced while contacting the mixture with nitrogen or a nitrogen-generating gas, evacuating the reaction vessel to a pressure of < 10 mbar and subsequently flooding the same with nitrogen or a nitrogen-generating gas to a pressure of 50 to 1000 mbar, repeating the evacuation and flooding cycles several times, and cooling the resultant reaction product in the reaction vessel.

16 Claims, No Drawings

SPHERICAL NITRIDE

BACKGROUND OF THE INVENTION

1. Field of the Invention

The present invention relates to a process of preparing a spherical powder of titanium nitride or titanium carbonitride, optionally containing a metal of the IVa, Va and VIa groups of the periodic table, and a novel powder of this type.

2. Description of the Prior Art

Titanium nitride, titanium carbonitride and mixed titanium carbonitrides are used primarily in the manufacture of cermet cutting materials, shaping tools and wear-resistant parts. Cermets are materials in which a ceramic is heat-bonded to a metal in which it is embedded. In addition to the indicated nitrides, many cermets also contain carbides of metals of the Va and VIa groups of the periodic table. The most desirable properties for specific uses, such as machining of steel, are obtained by suitably combining these hard materials and varying the grain size and shape of the hard material particles. European patent No. 512,967, for example, discloses that excellent properties for forming and milling may be obtained with hard titanium carbonitrides of different grain sizes.

Various processes for preparing titanium nitride, titanium carbonitride and mixed titanium carbonitrides are known. At present, the prevailing process of preparing titanium carbonitride, which optionally may contain other substances, comprises annealing a reaction mixture of titanium carbide optionally containing other carbides and/or metals with carbon and titanium nitride in a nitrogen atmosphere at a temperature of about 1500° C. In another known process, the selected metal powders are reacted with nitrogen, with the optional addition of carbon. In a reaction described by E. Friedrich and L. Sittig in 1925, titanium nitride containing carbon is obtained by reacting titanium oxide with carbon and nitrogen. To obtain a product containing between 0.3–1%, by weight, of oxygen, temperatures around 2000° C. are required. Since the high reaction temperature causes the product to be sintered together, it must be milled in a very expensive comminution stage to obtain the desired grain size. At any rate, the resultant product is a powder of a wide grain spectrum and a splintered polygonal shape.

Austrian patent No. 394,188 which corresponds to U.S. Pat. No. 5,147,831, describes a process of preparing a fine-grained titanium nitride or carbonitride powder on the basis of the oxide, which has spherical grains and a narrow grain spectrum. However, it has not been possible to prepare with this process a coarse-grained powder of spherical shape and a narrow grain spectrum.

SUMMARY OF THE INVENTION

It is the primary object of this invention to provide a spherical nitride and/or carbonitride powder of a narrow grain spectrum and an average grain size of > 2 µm.

The above and other objects are accomplished according to the invention with a process comprising the steps of introducing into a reaction vessel at least one substance selected from the group consisting of titanium metal and an oxide, carbide, nitride and carbonitride of said metal, and preferably a carbon-containing substance, establishing a nitrogen atmosphere in the reaction vessel, heating the substance in the reaction vessel to a temperature between 800° C. and 2400° C. and maintaining the temperature between 1400° C. and 2000° C. until gaseous reaction products are produced, removing the gaseous reaction products as they are produced while contacting the substance with nitrogen or a nitrogen-generating gas, evacuating the reaction vessel to a pressure of < 10 mbar and subsequently flooding the same with nitrogen or a nitrogen-generating gas to a pressure of 50 to 1000 mbar, repeating the evacuation and flooding cycles several times, and cooling the resultant reaction product in the reaction vessel. Optionally, a substance selected from the group consisting of a metal of the IVa, Va, or VIa group of the periodic table, or an oxide, carbide, nitride or carbonitride may be added to the titanium-containing substance.

Throughout the specification and the claims, the term "narrow grain spectrum" means that the grain size factor between the $D_{10}$ and $D_{90}$ point is no more than 20. For example, if the grain size at $D_{10}$ is 0.5 µm, it is 10 µm at $D_{90}$. $D_{10}$ and $D_{90}$ are the grain sizes at grain accumulations of 10% and 90%. The grain spectrum may be determined in the coarse grain size range by image analysis in electron scan microscope images, and in the fine grain size range by sedimentation analysis in a sedigraph.

A screen bottom in the reaction vessel and a gas-tightly sealed chamber below or above the screen bottom enables the stream of nitrogen to be passed in contact with the mixture in the reaction vessel while it is being heated while the reaction vessel chamber above or below the screen bottom is under a pressure of about 1 to 40 mbar. The nitrogen stream flowing though the mixture in the reaction vessel and the evacuation and flooding cycles are decisive for the success of the process. The evacuation cycle may be widely varied by the pressure difference between the pressure under which the stream of nitrogen is supplied and the pressure in the evacuated reaction vessel chamber. Success will be assured if, based on the specific surface of the reaction mixture which continuously changes during the reaction, the nitrogen stream is supplied at a rate of 0.1 to 5 cu.cm/sq.m per hour, or, based on a kilogram of the reaction mixture, at a rate of 0.2 to 5, preferably 0.5 to 2, liter per minute.

Depending on the type of reaction vessel used and whether the reaction mixture is in the form of thin layers or pellets or briquettes, the stream of nitrogen may be passed through the mixture and over it. At any rate, such gaseous reaction products as CO and the like must be rapidly removed. After the reaction is close to completion at a temperature of about 1800° C., the stream of nitrogen is interrupted and the reaction vessel is evacuated, preferably to a pressure of < 1 mbar. This causes the nitride, carbonitride or mixed carbonitride to lose a portion of the bound nitrogen. The subsequent flooding with nitrogen or a nitrogen-generating gas causes nitriding again, together with a pronounced heating, leading to a considerable increase in the temperature of the reaction product. The repetition of the evacuation and flooding cycles causes the grains to grow without sintering the reaction product, which would make an expensive milling stage necessary. The product consists of spherical grains, which positively influences further processing, and the powder has a narrow grain spectrum and an average grain size of > 2 µm, preferably > 3 µm. This powder is excellently adapted for use in coarse-grained cermets and in admixture with fine and submicron hard material powders.

In carrying out the process of the present invention, the oxygen is pumped out from the reaction vessel equipped with a heating device and the reaction vessel is flooded several times with nitrogen after the mixture has been introduced into the vessel. After a vacuum of less than 1 mbar has been achieved, heating is started. The reduction of the oxide or oxides begins when the temperature reaches about 800° C. to 1000° C. At the same time, the stream of nitrogen is introduced and the gaseous reaction products are removed. A substantial holding time at a temperature of 1500° C. to 1600° C. under a stream of nitrogen assures a complete reduction of the oxides and a conversion to the nitrides. To reduce the oxygen content to less than 0.5%, by weight, an increase to a temperature of about 1800° C. is required, and this temperature should be maintained for about one to two hours. This maintenance of a high temperature may also be effected in stages at different temperature levels within the indicated range. Subsequently, the reaction vessel is evacuated to a pressure of < 1 mbar, and immediately thereafter or after holding the temperature for 10 to 20 minutes, the reaction vessel is flooded to attain a pressure of not exceeding 1000 mbar, preferably 500 mbar, and most preferred between 100 and 200 mbar. The evacuation and flooding cycles are repeated a number of times, depending on the desired average grain size of the powder particles. Experience has shown that three to five cycles are sufficient to obtain a grain size of around 4 μm.

The reaction mixture may be introduce in the form of pellets or briquettes, or it may be pressed or stamped into the vessel in a compact mass. In the latter case, the removal of the gaseous reaction products and the flooding of the mass with nitrogen will be considerably enhanced if a multiplicity of channels is formed in the mass.

The cooled reaction product has an average grain size exceeding 2 μm, preferably 3 μm, and has a narrow grain spectrum. Its oxygen content is in the range of 0.05–0.5%, by weight, and the content of free carbon is less than 0.1%, by weight. A light milling may be necessary to remove agglomerates.

DETAILED DESCRIPTION OF PREFERRED EMBODIMENTS

The following specific examples will illustrate some preferred embodiments of this invention, all parts being by weight:

EXAMPLE 1

A reaction mixture consisting of 72.8 parts of titanium oxide and 27.2 parts of carbon black was well mixed in a turbine blade mixer, and the mixture was pressed into a graphite reaction vessel with a screen bottom. After a multiplicity of channels was formed in the stamped mass in the vessel, the graphite reaction vessel was placed gastightly on a chamber holding nitrogen, which chamber was mounted within a resistance heating device. The cover was then closed over the vessel and the interior of the closed vessel was slowly evacuated to a pressure of less than 1 mbar to remove the oxygen, the vessel being twice flushed with nitrogen. When the pressure in the closed reaction vessel reached a nitrogen pressure of 1 to 10 mbar, heating of the vessel was begun. The heating velocity was 10° C. to 20° C. per minute. When the temperature reached 800° C. to 1000° C., reduction of the oxide was indicated to have started by the slow increase in pressure. At this point, the removal of the gaseous reaction products by suction was started while a stream of nitrogen in the amount of 1 liter/minute was passed through the reaction mixture from the chamber holding the nitrogen. The pressure in the vessel reached 50 mbar, the average pressure being about 10 mbar. After a temperature of 1600° C. was reached, it was maintained at that level for five hours. Subsequently, the temperature was increased to 1800° C. and was maintained at that level for 1.5 hours while the flow of nitrogen was continued.

Subsequently, the pressure in the vessel was reduced to less than 1 mbar and then flooded with nitrogen to attain a pressure of about 100 mbar. This cycle was repeated four times. The resultant reaction product was cooled in the reaction vessel in a nitrogen atmosphere at a pressure of about 800 mbar. The product had the following chemical and physical properties, all percentages being by weight:

| % bound C | 11.7 |
| % free C | <0.05 |
| % N | 9.1 |
| % O | 0.12 |
| Average grain size | 4.2 μm |

To remove agglomeration the product was milled 30 minutes in a remove laboratory comminutor filled product with hard metal balls, under gasoline. After the milling livid was removed in a vacuum drier, the resultant powder had the following properties:

| % bound C | 11.7 |
| % free C | <0.05 |
| % N | 9.2 |
| % O | 0.15 |
| % W | 0.2 |
| % Fe | <0.01 |
| Average grain size | 4.0 μm |

Because of the morphology of the powder particles, the oxygen content and the grain size, the product was found to be excellent for the production of cermets with a mixed grain size structure or of a coarse-grained quality.

The elements W and Fe are coming from the hard metal balls and the walls of the laboratory comminutor.

EXAMPLE 2

The same procedure was followed with a mixture consisting of 51.2 parts of titanium oxide, 29.3 parts of tungsten metal powder and 19.5 parts of carbon black, except that the temperature was maintained at 1600° C. for only four hours.

The product had the following chemical and physical properties, all percentages being by weight:

| % bound C | 9.9 |
| % free C | 0.05 |
| % N | 4.1 |
| % O | 0.3 |
| % W | 41.3 |
| % Ti | remainder |
| Average grain size | 5.6 μm |

After milling, the resultant powder had the following properties:

| % bound C | 10.0 |
| % free C | 0.05 |
| % N | 4.2 |
| % O | 0.4 |
| % W | 41.5 |
| % Fe | 0.03 |
| % Ti | remainder |
| Average grain size | 5.0 μm |

EXAMPLE 3

As in Example 1, 60.9 parts of titanium oxide, 89.7 parts of tungsten oxide and 25.6 parts of carbon black were well mixed and were formed into tablets under the pressure of 5 tons/cu.cm. These tablets were placed into the reaction vessel, and the further process steps were the same as in Example 1. The final product had the following chemical and physical properties, all percentages being by weight:

| | | |
|---|---|---|
| | % bound C | 9.7 |
| | % free C | 0.05 |
| | % N | 8.9 |
| | % O | 0.2 |
| | % W | 9.5 |
| | % Ta | 9.4 |
| | % Fe | 0.01 |
| | Average grain size | 4.5 µm |

The products prepared in the examples are titanium carbonitrides, which may contain a metal of the IVa, Va or VIa group of the periodic table, in the form of spherical grains, containing little oxygen, and having an average grain size of more than 2 µm.

In examples 2 and 3 the element Fe is coming from the walls of the milling vessel.

What is claimed:

1. A process of preparing a spherical powder selected from the group consisting of titanium nitride and titanium carbonitride, said powder having an average grain size of more than 2 µm and a narrow grain spectrum, which comprises the steps of
   (a) introducing into a reaction vessel at least one substance selected from the group consisting of titanium metal and an oxide, carbide, nitride and carbonitride of said metal,
   (b) establishing a nitrogen atmosphere in the reaction vessel,
   (c) heating the substance in the reaction vessel to a temperature between 800° C. and 2400° C. and maintaining the temperature between 1400° C. and 2000° C. until gaseous reaction products are produced,
   (d) removing the gaseous reaction products as they are produced while contacting the substance with nitrogen or a nitrogen-generating gas,
   (e) evacuating the reaction vessel to a pressure of <10 mbar and subsequently flooding the same with nitrogen or a nitrogen-generating gas to a pressure of 50 to 1000 mbar after the substance has been heated to said temperature and maintained at said temperature,
   (f) then repeating the evacuation and flooding cycles several times, and
   (g) cooling the resultant reaction product in the reaction vessel.

2. The process of claim 1, wherein at least one substance of another metal selected from the group consisting of a metal of the IVa, Va and VIa group of the periodic table and an oxide, carbide, nitride and carbonitride thereof is added to the titanium-containing substance.

3. The process of claim 1, wherein a carbon-containing substance is added to the titanium-containing substance.

4. The process of claim 1, wherein the substance is heated in the reaction vessel to a temperature of 1400° C. to 2000° C.

5. The process of claim 1, wherein the evacuation and flooding cycles are repeated no more than five times.

6. The process of claim 1, wherein the reaction vessel is evacuated while the substance is heated and maintained at said temperature, the pressure not exceeding 200 mbar.

7. The process of claim 4, wherein the pressure does not exceed 100 mbar.

8. The process of claim 1, wherein the substance is contacted with nitrogen or a nitrogen-generating gas by continuously passing a stream of the gas through or over the substance, the gas stream being supplied at a rate of 0.2 to 5 liter per minute for each kilogram of the substance.

9. The process of claim 8, wherein the gas stream is supplied at a rate of 0.5 to 2 liter per minute for each kilogram of the substance.

10. The process of claim 1, wherein the temperature is maintained at several levels of temperature.

11. The process of claim 1, wherein the reaction vessel is evacuated at least once subsequently to maintaining the substance at said temperature, and is subsequently flooded with said gas.

12. The process of claim 11, wherein the reaction vessels is evacuated to a pressure of <1 mbar, and is subsequently flooded with said gas to a pressure not exceeding 500 mbar.

13. The process of claim 1, wherein the substance is pressed together in the reaction vessel and a multiplicity of channels are formed in the pressed substance to facilitate the removal of the gaseous reaction products and the flooding with said gas.

14. The process of claim 1, wherein the substance is in the form of pellets.

15. The process of claim 1, wherein the substance is in the form of briquettes.

16. The process of claim 1, wherein the cooled reaction product is milled in an inert atmosphere.

* * * * *